(12) United States Patent
Paulson et al.

(10) Patent No.: US 10,787,267 B2
(45) Date of Patent: Sep. 29, 2020

(54) ELECTRICAL BUS ARRANGEMENT FOR ICE PROTECTION SYSTEMS

(71) Applicant: Bell Helicopter Textron Inc., Fort Worth, TX (US)

(72) Inventors: Jared Mark Paulson, Fort Worth, TX (US); Michael Christopher Burnett, Fort Worth, TX (US); Christopher E. Foskey, Keller, TX (US)

(73) Assignee: BELL HELICOPTER TEXTRON INC., Fort Worth, TX (US)

( * ) Notice: Subject to any disclaimer, the term of this patent is extended or adjusted under 35 U.S.C. 154(b) by 427 days.

(21) Appl. No.: 15/608,385

(22) Filed: May 30, 2017

(65) Prior Publication Data

US 2018/0346133 A1    Dec. 6, 2018

(51) Int. Cl.
| | | |
|---|---|---|
| *B64D 15/12* | (2006.01) | |
| *F03D 80/40* | (2016.01) | |
| *H05B 3/02* | (2006.01) | |
| *B64C 27/46* | (2006.01) | |
| *B64C 27/467* | (2006.01) | |

(Continued)

(52) U.S. Cl.
CPC ............ *B64D 15/12* (2013.01); *B64C 27/463* (2013.01); *B64C 27/467* (2013.01); *F03D 80/40* (2016.05); *H05B 3/023* (2013.01); *F01D 25/02* (2013.01); *F03D 1/0675* (2013.01); *F05D 2220/36* (2013.01); *H05B 2203/011* (2013.01); *H05B 2214/02* (2013.01)

(58) Field of Classification Search
CPC ................................ B64D 15/12; F03D 80/40
See application file for complete search history.

(56) References Cited

U.S. PATENT DOCUMENTS

| | | |
|---|---|---|
| 2,205,543 A | 6/1940 | Rideau et al. |
| 2,552,075 A | 8/1944 | Daam |

(Continued)

FOREIGN PATENT DOCUMENTS

| | | |
|---|---|---|
| CA | 1098812 | 4/1977 |
| CA | 2741154 | 11/2011 |

(Continued)

OTHER PUBLICATIONS

European Patent Office, European Search Report for EP Appl. No. 17179897.8 dated Feb. 2, 2018, 4 pp.

(Continued)

*Primary Examiner* — Timothy D Collins
*Assistant Examiner* — Terri L Filosi
(74) *Attorney, Agent, or Firm* — Daniel J. Chalker; Edwin S. Flores; Chalker Flores, LLP

(57) ABSTRACT

The present invention includes a first barrier layer configured to cover a leading edge of the blade or wing; one or more electrical bus bars disposed on the first barrier layer proximate to and substantially parallel with the leading edge; a ground bus bar disposed on the first barrier layer proximate to and substantially parallel with the leading edge; a second barrier layer disposed over the one or more electrical bus bars and the ground bus bar; one or more heating elements disposed on the second barrier layer, and each heating element electrically connected to one of the electrical bus bars and to the ground bus bar; and a third barrier layer disposed over the one or more heating elements.

28 Claims, 8 Drawing Sheets

(51) Int. Cl.
    *F01D 25/02*     (2006.01)
    *F03D 1/06*     (2006.01)

(56) References Cited

U.S. PATENT DOCUMENTS

| | | | | |
|---|---|---|---|---|
| 10,293,947 | B2* | 5/2019 | Hu | B64D 15/12 |
| 2007/0210073 | A1 | 9/2007 | Hubert et al. | |
| 2013/0001211 | A1* | 1/2013 | Lewis | B64D 15/12 |
| | | | | 219/201 |
| 2020/0023976 | A1* | 1/2020 | Kinlen | B64C 27/46 |

FOREIGN PATENT DOCUMENTS

| | | | |
|---|---|---|---|
| CA | 3005501 | A1 | 11/2018 |
| EP | 2873618 | A1 | 5/2015 |
| EP | 3409588 | A1 | 12/2018 |

OTHER PUBLICATIONS

European Patent Office, Communication pursuant to Article 94(3) EPC for EP Appl. No. 17179897.8 dated Feb. 20, 2018, 8 pp.
European Patent Office, Communication pursuant to Article 94(3) EPC for EP Appl. No. 17179897.8 dated Sep. 4, 2018, 9 pp.
Canadian Intellectual Property Office, Examination Report for Canada Patent Appl. No. 3,005,501 dated Apr. 4, 2019, 4 pp.

\* cited by examiner

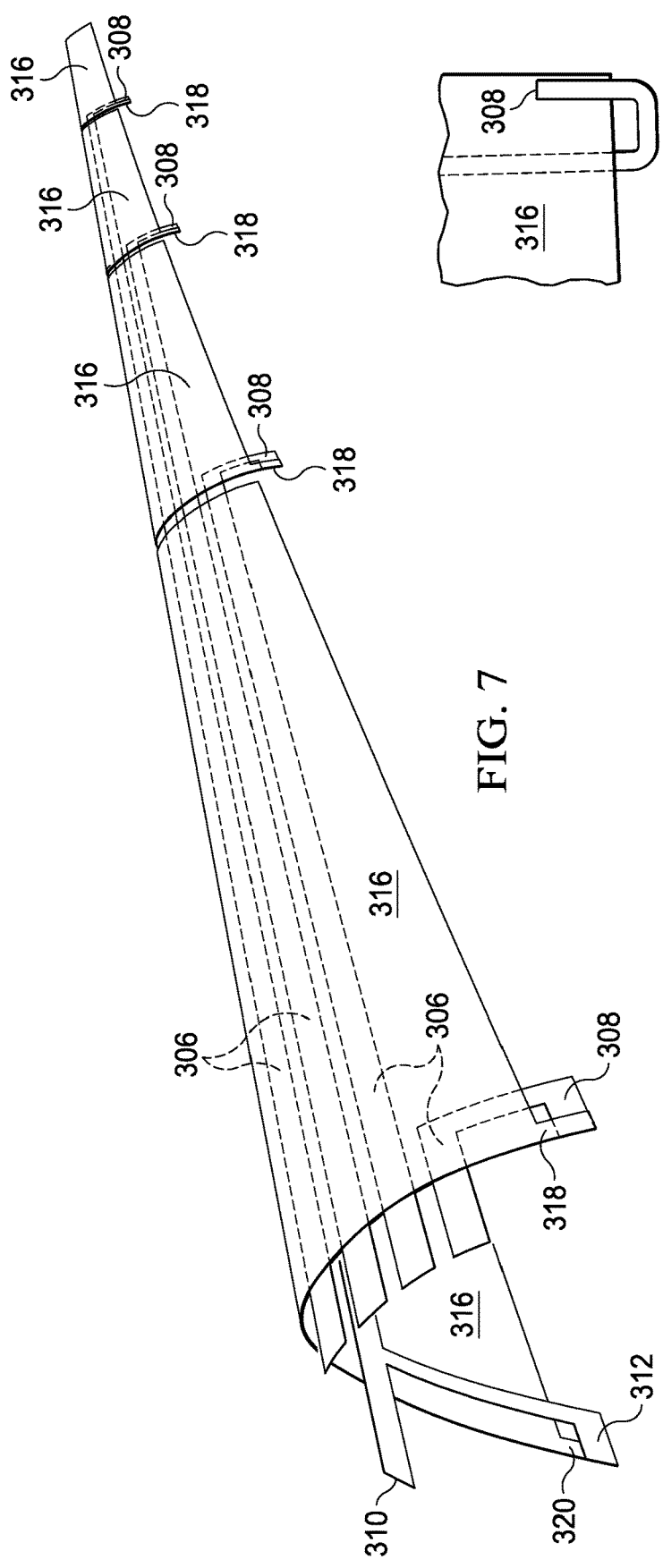

ELECTRICAL BUS ARRANGEMENT FOR ICE PROTECTION SYSTEMS

CROSS-REFERENCE TO RELATED APPLICATIONS

Not applicable.

STATEMENT OF FEDERALLY FUNDED RESEARCH

Not applicable.

TECHNICAL FIELD OF THE INVENTION

The present invention relates in general to the field of ice protection technology, and more particularly, to electrical bus arrangements in ice protection systems.

BACKGROUND OF THE INVENTION

Without limiting the scope of the invention, its background is described in connection with electrical bus arrangements in ice protection systems.

Historically, electrical bus bars on proprotor de-ice blankets run spanwise down the blade aft of the heating elements that are biased toward the blade leading edge, since the heating elements and bus bars are laid up on the same layer within a multi-layer composite part. This causes the bus bars to run through the highest-strained areas on the blade, which threatens the reliability of the ice protection solution. Existing systems use a braided wire bus that has to be soldered to the conductive elements. Due to some aircrafts' requirements for certain heated zone configurations, braided wire bus has been required because it is one of the few known solutions that is able to run down the span of the blade and able to withstand the high strains exhibited by some rotor blades.

Several rotorcraft and fixed-wing aircraft are required to have ice protection systems for the leading edges of rotorcraft blades or wings to prevent excessive ice accumulation. The high strain environments seen by many blades or wings bring about limitations in materials and technologies that can reliably function in extreme flight conditions and compact areas within the blade or wing. Existing electrical bus solutions that can withstand high strains include braided wire and are required to be soldered to the connecting conductive elements. However, solder joints are notoriously problematic as they are highly dependent on the human process in place and cannot always achieve a robust electrical connection in highly dynamic environments. The highest strains on some blades or wings are located around midspan at the aft edges of the heater blanket. Thus, a need remains for more reliable ice protection solutions.

SUMMARY OF THE INVENTION

In some embodiments of the disclosure, an assembly is disclosed as comprising a first barrier layer configured to cover a leading edge of the blade or wing; one or more electrical bus bars disposed on the first barrier layer proximate to and substantially parallel with the leading edge, each electrical bus bar having an electrical lead; a ground bus bar disposed on the first barrier layer proximate to and substantially parallel with the leading edge, the ground bus bar having one or more ground leads; a second barrier layer disposed over the one or more electrical bus bars and the ground bus bar such that all or part of the electrical leads of the one or more electrical bus bars and all or part of the ground leads of the ground bus bar are not covered by the second barrier layer; one or more heating elements disposed on the second barrier layer, and each heating element having a first lead electrically connected to the electrical lead of one of the electrical bus bars and a second lead electrically connected to one of the ground leads of the ground bus bar; and a third barrier layer disposed over the one or more heating elements. In some aspects, the electrical lead of each electrical bus bar extends chordwise away from the electrical bus bar; and each ground lead of the ground bus bar extends chordwise away from the ground bus bar. In some aspects, the electrical lead of each electrical bus bar is J-shaped, L-shaped or has an enlarged end forming a contact pad; and each ground lead of the ground bus bar is J-shaped, L-shaped or has an enlarged end forming a contact pad. In some aspects, the first lead and second lead of each heating element is J-shaped, L-shaped or has an enlarged end forming a contact pad. In some aspects, the assembly further comprises an adhesive layer disposed on the first barrier layer, the one or more electrical bus bars, the ground bus bar, the second barrier layer, or the one or more heating elements. In some aspects, the first barrier layer, the second barrier layer, or the third barrier layer comprise a coating or a sleeve. In some aspects, the first barrier layer and the third barrier layer substantially encapsulate the one or more electrical bus bars, the ground bus bar, the second barrier layer and the one or more heating elements. In some aspects, the assembly further comprises an adhesion layer disposed on the third barrier layer. In some aspects, the assembly further comprises a nose guard or protective layer disposed on a portion of the adhesion layer proximate to the leading edge. In some aspects, the assembly further comprises a controller electrically connected to the one or more electrical bus bars that operates and monitors the one or more heating elements.

In some embodiments of the disclosure, a system is disclosed as comprising a blade or wing having a leading edge and an outer sheath; a first barrier layer disposed on a portion of the outer sheath that covers the leading edge of the blade or wing; one or more electrical bus bars disposed on the first barrier layer proximate to and substantially parallel with the leading edge, each electrical bus bar having an electrical lead; a ground bus bar disposed on the first barrier layer proximate to and substantially parallel with the leading edge, the ground bus bar having one or more ground leads; a second barrier layer disposed over the one or more electrical bus bars and the ground bus bar such that all or part of the electrical leads of the one or more electrical bus bars and all or part of the ground leads of the ground bus bar are not covered by the second barrier layer; one or more heating elements disposed on the second barrier layer, each heating element having a first lead electrically connected to the electrical lead of one of the electrical bus bars and a second lead electrically connected to one of the ground leads of the ground bus bar; a third barrier layer disposed over the one or more heating elements; an adhesion layer disposed on the third barrier layer; a controller electrically connected to the one or more electrical bus bars that operates and monitors the one or more heating elements; and the ground bus bar is either electrically connected to the controller or a common ground. In some aspects, the electrical lead of each electrical bus bar extends chordwise away from the electrical bus bar; and each ground lead of the ground bus bar extends chordwise away from the ground bus bar. In some aspects, the electrical lead of each electrical bus bar is J-shaped, L-shaped or has an enlarged end forming a contact pad; and each ground lead of the ground bus bar is J-shaped, L-shaped or has an enlarged end forming a contact pad. In some aspects, the first lead and second lead of each heating element is J-shaped, L-shaped or has an enlarged end forming a contact pad. In some aspects, the system further comprises an adhesive layer disposed on the first barrier layer, the one or more electrical bus bars, the ground bus bar, the second barrier layer, the one or more heating elements, or the third barrier layer. In some aspects, the second barrier layer, or the third barrier layer comprise a coating or a sleeve. In some aspects, the first barrier layer and the third barrier layer substantially encapsulate the one or more electrical bus bars, the ground bus bar, the second barrier layer and the one or more heating elements. In some aspects, the system further comprises a nose guard or protective layer on a portion of the adhesion layer proximate to the leading edge. In some aspects, the blade is part of a propeller, a proprotor, a rotor or a wind turbine; or the wing is part of a fixed-wing aircraft, a tilt-rotor aircraft or a rotorcraft.

In some embodiments of the disclosure, a method is disclosed as comprising providing at least a portion of the blade or wing having a leading edge and an outer sheath; placing a first barrier layer on an outer surface of the outer sheath proximate to the leading edge; placing one or more electrical bus bars and a ground bus bar on the first barrier layer proximate to and substantially parallel to the leading edge, each electrical bus bar having an electrical lead, and the ground bus bar having one or more ground leads; placing a second barrier layer over the one or more electrical bus bars and the ground bus bar such that all or part of the electrical leads of the one or more electrical bus bars and all or part of the ground leads of the ground bus bar are not covered by the second barrier layer; placing one or more heating elements on the second barrier layer, each heating element having a first lead and a second lead; electrically connecting the first lead of each heating element to the electrical lead of one of the electrical bus bars; electrically connecting the second lead of each heating element to one of the ground leads of the ground bus bar; placing a third barrier layer over the one or more heating elements; and placing an adhesion layer over the third barrier layer. In some aspects, the electrical lead of each electrical bus bar extends chordwise away from the bus bar; and each ground lead of the ground bus bar extends chordwise away from the ground bus bar. In some aspects, the electrical lead of each electrical bus bar is J-shaped, L-shaped or has an enlarged end forming a contact pad; and each ground lead of the ground bus bar is J-shaped, L-shaped or has an enlarged end forming a contact pad. In some aspects, the first lead and second lead of each heating element is J-shaped, L-shaped or has an enlarged end forming a contact pad. In some aspects, the method further comprises placing an adhesive layer on the first barrier layer, the one or more electrical bus bars, the ground bus bar, the second barrier layer, the one or more heating elements, or the third barrier layer. In some aspects, the first barrier layer, the second barrier layer, or the third barrier layer comprise a coating or a sleeve. In some aspects, the first barrier layer and the third barrier layer substantially encapsulate the one or more electrical bus bars, the ground bus bar, the second barrier layer and the one or more heating elements. In some aspects, the method further comprises placing a nose guard or protective layer on a portion of the adhesion layer proximate to the leading edge. In some aspects, the method further comprises bonding the first barrier layer, the one or more electrical bus bars, the ground bus bar, the second barrier layer, the one or more heating elements, the third barrier layer and the adhesion layer to one another. In some aspects, the method further comprises curing the leading edge assembly.

In some embodiments of the disclosure, a method is disclosed as comprising providing the blade or wing having a leading edge, an outer sheath and the heating system, the heating system comprising: a first barrier layer disposed on a portion of the outer sheath that covers a leading edge of the blade or wing, one or more electrical bus bars disposed on the first barrier layer proximate to and substantially parallel with the leading edge, each electrical bus bar having an electrical lead, a ground bus bar disposed on the first barrier layer proximate to and substantially parallel with the leading edge, the ground bus bar having one or more ground leads, a second barrier layer disposed over the one or more electrical bus bars and the ground bus bar such that all or part of the electrical leads of the one or more electrical bus bars and all or part of the ground leads of the ground bus bar are not covered by the second barrier layer, one or more heating elements disposed on the second barrier layer, each heating element having a first lead electrically connected to the electrical lead of one of the electrical bus bars and a second lead electrically connected to one of the ground leads of the ground bus bar, a third barrier layer disposed over the one or more heating elements, an adhesion layer disposed on the third barrier layer, a controller electrically connected to the one or more electrical bus bars that operates and monitors the one or more heating elements, and the ground bus bar is either electrically connected to the controller or a common ground; monitoring one or more operational parameters; and controlling the one or more heating elements in response to the operational parameters using the controller to de-ice the blade or wing, or prevent icing of the blade or wing.

In some embodiments of the disclosure, an aircraft is disclosed as comprising a fuselage; a blade or wing coupled to the fuselage, the blade or wing comprising a heating element, the heating element comprising a first barrier layer configured to cover a leading edge of the blade or wing; one or more electrical bus bars disposed on the first barrier layer proximate to and substantially parallel with the leading edge, each electrical bus bar having an electrical lead; a ground bus bar disposed on the first barrier layer proximate to and substantially parallel with the leading edge, the ground bus bar having one or more ground leads; a second barrier layer disposed over the one or more electrical bus bars and the ground bus bar such that all or part of the electrical leads of the one or more electrical bus bars and all or part of the ground leads of the ground bus bar are not covered by the second barrier layer; one or more heating elements disposed on the second barrier layer, and each heating element having a first lead electrically connected to the electrical lead of one of the electrical bus bars and a second lead electrically connected to one of the ground leads of the ground bus bar; and a third barrier layer disposed over the one or more heating elements.

In addition to the foregoing, various other method, system, and apparatus aspects are set forth in the teachings of the present disclosure, such as the claims, text, and drawings forming a part of the present disclosure.

The foregoing is a summary and thus contains, by necessity, simplifications, generalizations, and omissions of detail. Consequently, those skilled in the art will appreciate that this summary is illustrative only and is not intended to be in any way limiting. There aspects, features, and advantages of the devices, processes, and other subject matter described herein will be become apparent in the teachings set forth herein.

BRIEF DESCRIPTION OF THE DRAWINGS

For a more complete understanding of the features and advantages of the present invention, reference is now made to the detailed description of the invention along with the accompanying figures and in which:

FIG. 7 shows a perspective view of heating elements, electrical bus bars, and a ground bus bar according to an alternative embodiment of the present invention;

FIG. 8 shows a connection of an electrical bus bar lead and a heating element according to an alternative embodiment of the present invention;

FIG. 9 shows an exploded view of electrical bus bars, a ground bus bar, and a first barrier layer according to an alternative embodiment of the present invention;

DETAILED DESCRIPTION OF THE INVENTION

Illustrative embodiments of the system of the present application are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various aspects of components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

The embodiments of the invention disclosed herein can avoid the highest strains on a blade or wing by locating the electrical bus bars near the leading edge. To do this without affecting the heating performance of the conductive elements, the bus bars are located directly underneath the elements with a barrier layer between the two to prevent electrical failure. The embodiments disclosed herein may use a broader range of materials and geometries for bus bar design, which opens up more possibilities of ice protection solutions with fewer solder joints than are typically used in existing systems or no solder joints.

Figure 1:
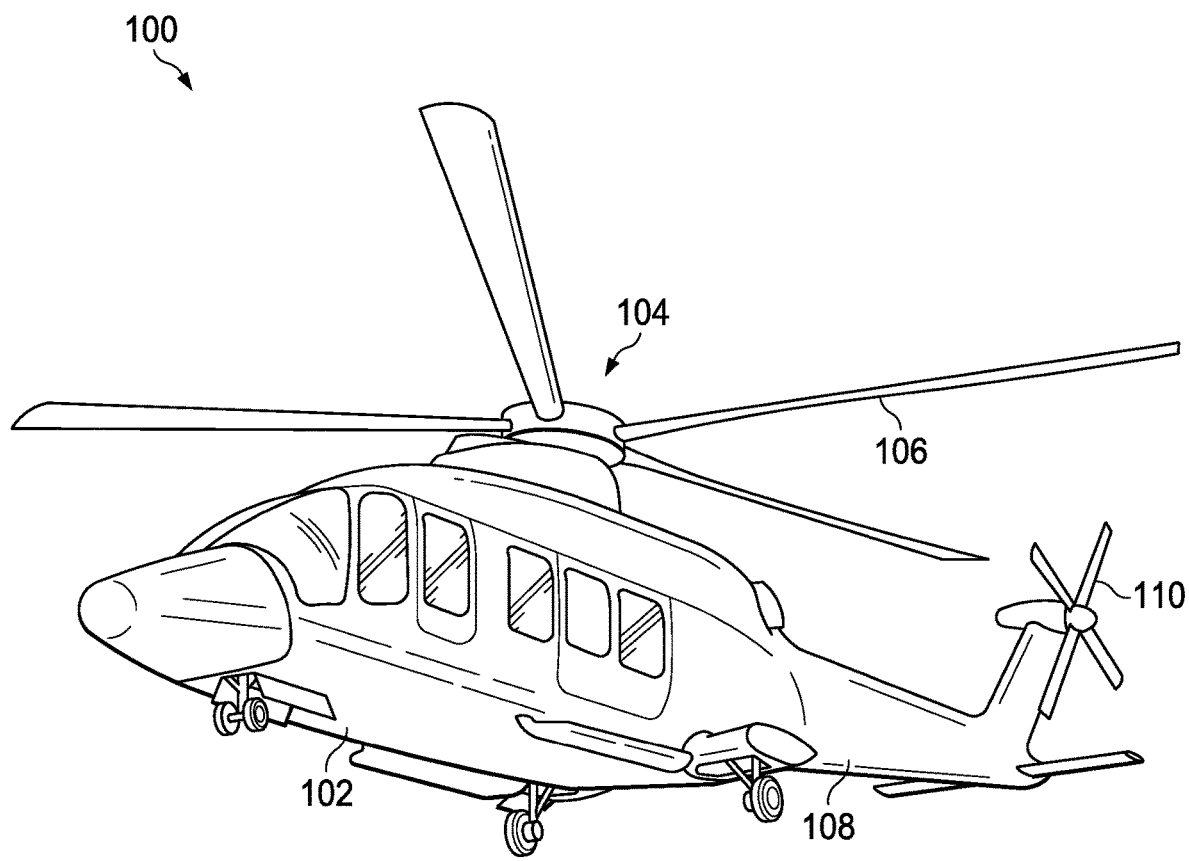
FIG. 1 shows a side view of a helicopter according to a particular embodiment of the present application.

FIG. 1 shows a helicopter 100 in accordance with a particular embodiment of the present application. In the exemplary embodiment, helicopter 100 having a fuselage 102 and a rotor system 104 carried thereon. A plurality of rotor blades 106 is operably associated with a rotor system 104 for creating flight. A tail boom 108 is depicted that further includes tail rotor 110.

Figure 2:
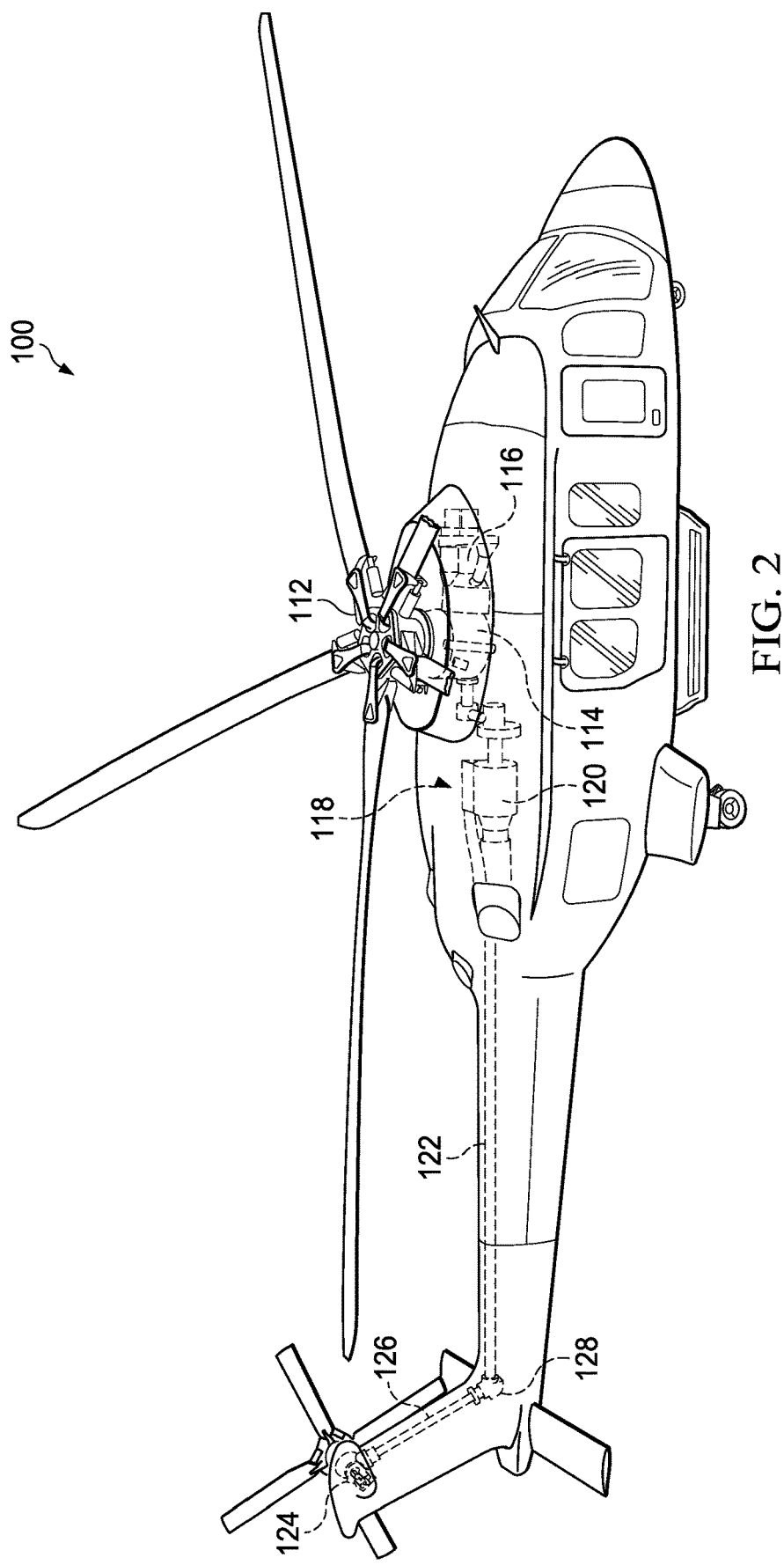
FIG. 2 shows a partial cross-section, perspective view of a helicopter according to an alternative embodiment of the present application.

For example, FIG. 2 shows a partial cross-section perspective view of helicopter 100 that includes additional detail of the present invention. Helicopter 100 further includes a rotor mast 112, which is connected to the main transmission 114. The main transmission 114 is connected to one or more accessory gear boxes 116. The main transmission is connected to an engine 120, which is engine compartment 118. A tail boom drive shaft 122 transmits mechanical rotation to the tail rotor gear box 124, which is connected via tail rotor drive shaft 126, via intermediate gear box 128.

Figure 3:
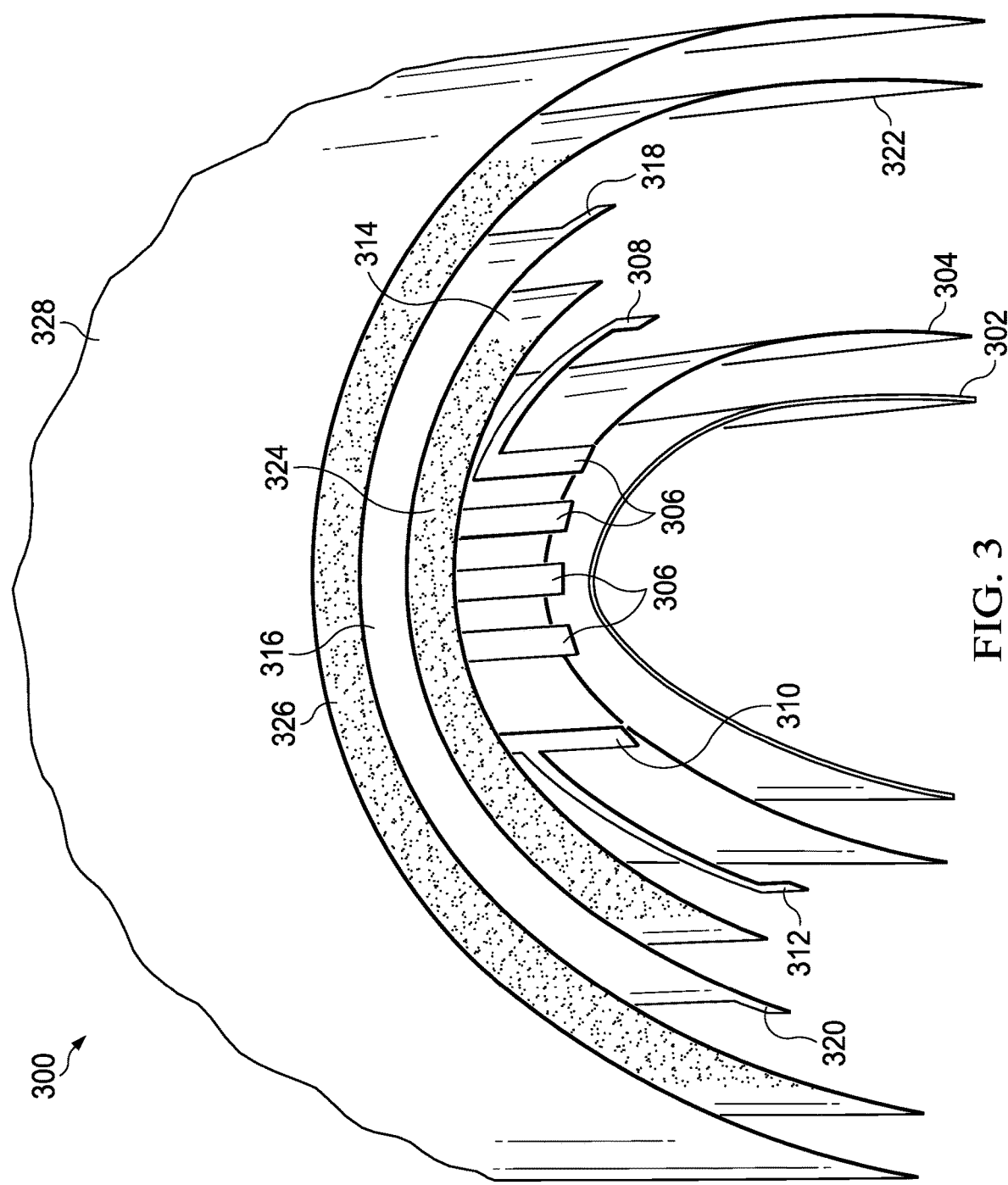
FIG. 3 shows an exploded view of a leading edge of an inboard end of a blade or rotor according to an alternative embodiment of the present invention.

FIG. 3 shows an exploded view of a leading edge of an inboard end of a blade or rotor according to one embodiment of the present invention. A composite heater blanket includes: conductive elements, electrical bus bars, and a ground bus bar that are sandwiched between several composite layers for insulation from other conductive materials that reside within a blade or wing, resulting in an ice protection solution without bus bars located in the highest-strained areas on the blade or wing. Heating element assembly 300 is added to outer sheath 302, which covers the leading edge of a rotor-blade spar and forms the leading edge blade contour of a blade or wing. Outer sheath 302 may comprise composite materials. First barrier layer 304 covers outer sheath 302 and the leading edge. First barrier layer 304 may be a coating or a sleeve, and it may comprise composite materials. One or more electrical bus bars 306 are disposed on first barrier layer 304 proximate to and substantially parallel with the leading edge, and each electrical bus bar has electrical lead 308. Each electrical lead 308 may extend chordwise away from electrical bus bars 306 and have a J-shape, an L-shape, an enlarged end forming a contact pad, or other shape as dictated by circumstances. Exemplary L-shaped electrical leads 308 are shown. Ground bus bar 310, which may be electrically connected to a common ground, is also disposed on first barrier layer 304 proximate to and substantially parallel with the leading edge, and ground bus bar 310 has one or more ground leads 312. Each ground lead 312 may extend chordwise away from ground bus bar 310 and may have a J-shape, an L-shape, an enlarged end forming a contact pad, or other shape as dictated by circumstances.

FIG. 3 also shows that a second barrier layer 314 is disposed over electrical bus bars 306 and ground bus bar 310 such that all or part of electrical leads 308 and all or part of ground leads 312 are not covered by the second barrier layer 314. Second barrier layer 314 may be a coating or a sleeve, and it may comprise composite materials. One or more heating elements 316 are disposed on second barrier layer 314. Each heating element 316 has an electrical heating element lead, first lead 318, that is electrically connected to an electrical lead 308, and a ground heating element lead, second lead 320, that is electrically connected to a ground lead 312. Each first lead 318 and each second lead 320 may have a J-shape, an L-shape, an enlarged end forming a contact pad, or other shape as dictated by circumstances. Third barrier layer 322 is disposed over the one or more heating elements 316. Third barrier layer 322 may be a coating or a sleeve, and it may comprise composite materials. First barrier layer 304 and third barrier layer 322 may substantially encapsulate the one or more electrical bus bars 306, ground bus bar 310, second barrier layer 314, and the one or more heating elements 316.

An adhesive layer 324 may be disposed on first barrier layer 304, the one or more electrical bus bars 306, ground bus bar 310, second barrier layer 314, one or more heating elements 316, or third barrier layer 322. An exemplary adhesive layer 324, disposed on second barrier layer 314, is shown as a stipple pattern. Adhesion layer 326 may be disposed on third barrier layer 322. Adhesive layer 326, disposed on third barrier layer 322, is shown as a stipple pattern. A protective layer or a nose guard may be disposed on a portion of adhesion layer 326; exemplary protective layer 328 is shown. Protective layer 328 or nose guard may comprise composite materials.

Figure 4:
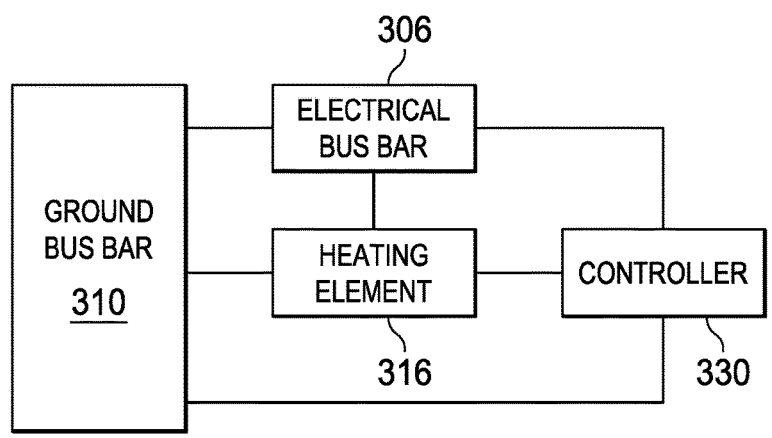
FIG. 4 shows a system block diagram of an alternative embodiment of the present invention.

FIG. 4 shows a system block diagram of another embodiment of the present invention. Each heating element 316 of the one or more heating elements 316 is electrically connected to at least one of the one or more electrical bus bars 306 and ground bus bar 310 as described in connection with FIG. 3. In addition, a controller 330 that operates and controls heating elements 316 in response to one or more monitored operational parameters to de-ice a blade or wing or prevent icing of the blade or wing may be electrically connected to heating elements 316, electrical bus bars 306, and ground bus bar 310, or, alternatively, directly to a common ground.

Figure 5:
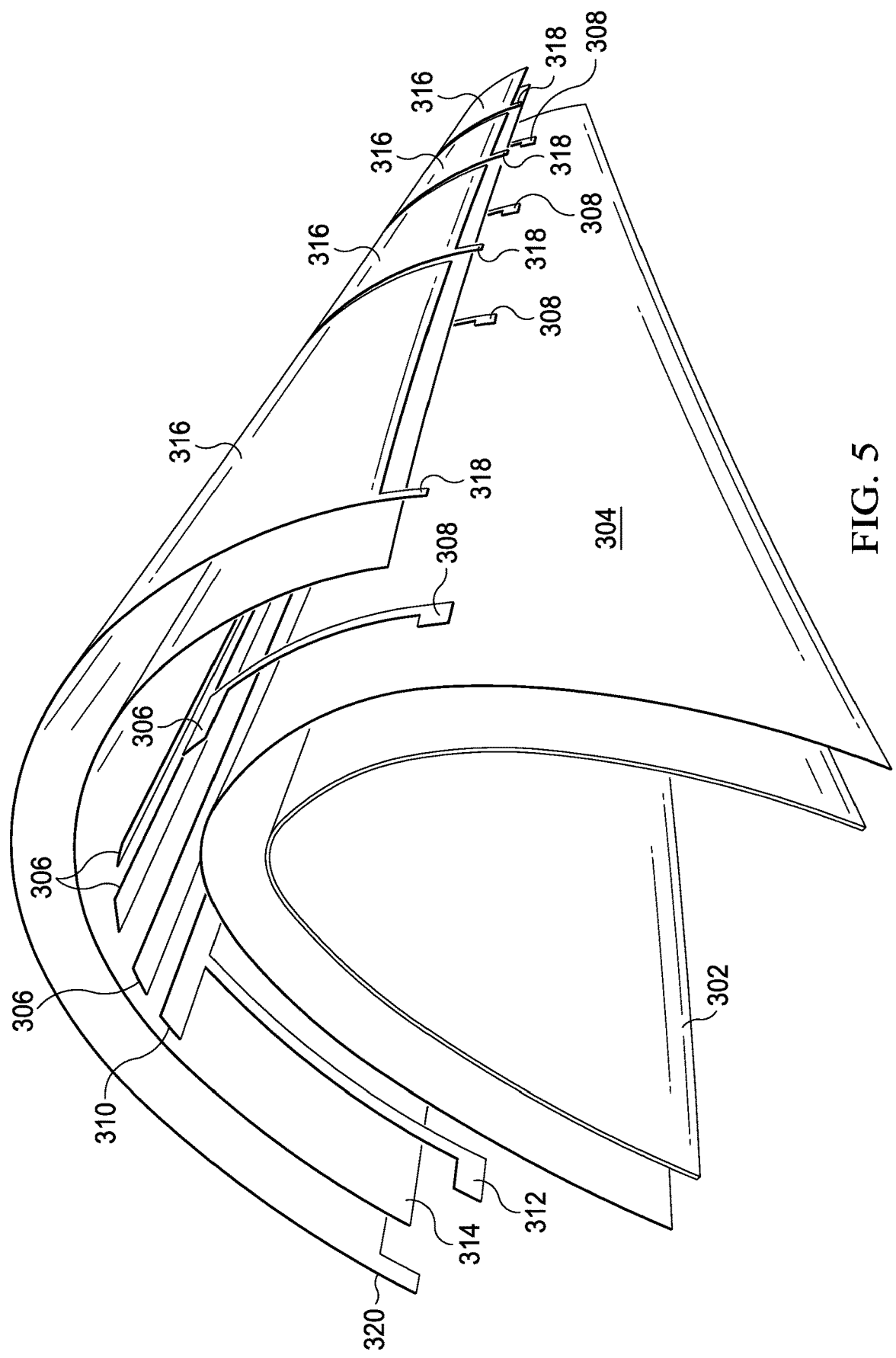
FIG. 5 shows another exploded view of part of a leading edge of an inboard end of a blade or rotor according to an alternative embodiment of the present invention.

FIG. 5 shows another exploded view of part of a leading edge of an inboard end of a blade or rotor according to another embodiment of the present invention, from a different viewpoint from that shown in FIG. 3, and with some components omitted for clarity. Proceeding outward from outer sheath 302, first barrier layer 304, electrical bus bars 306, electrical leads 308, ground bus bar 310, ground lead 312, second barrier layer 314, heating elements 316, first leads 318, and second lead 320 are shown.

Figure 6:
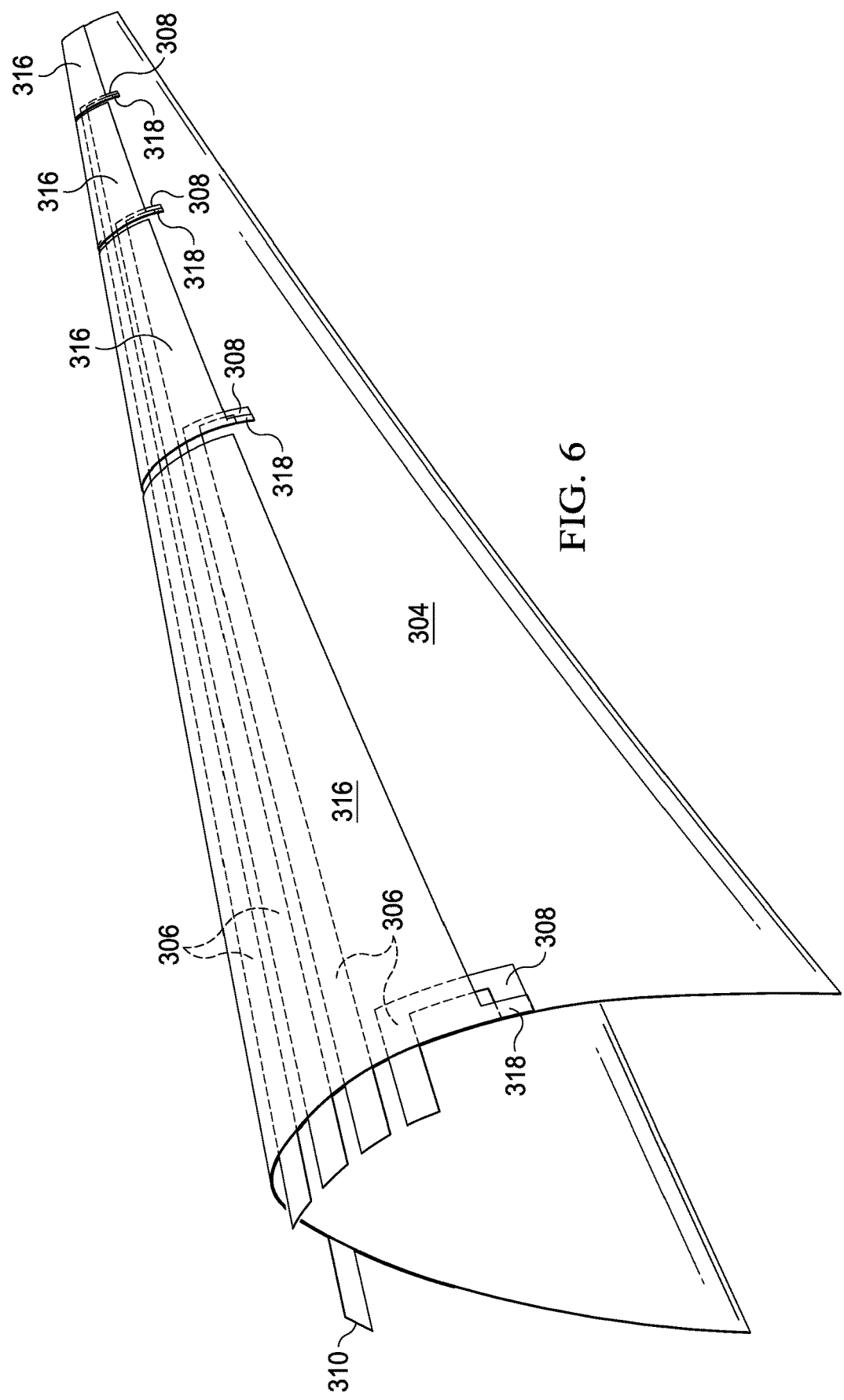
FIG. 6 shows a perspective view of heating elements, electrical bus bars, a ground bus bar, and a first barrier layer according to an alternative embodiment of the present invention.

FIG. 6 shows a perspective view of heating elements, electrical bus bars, electrical leads, a ground bus bar, and a first barrier layer according to an alternative embodiment of the present invention. This view omits other components for clarity. First barrier layer 304 is shown beneath electrical bus bars 306 and ground bus bar 310. Electrical bus bars 306 are shown with electrical leads 308. Heating elements 316 are shown overlaying electrical bus bars 306 and ground bus bar 310. Second barrier layer 314, which lies above electrical bus bars 306 and ground bus bar 310 and below heating elements 316, is omitted from view.

FIG. 7 shows a perspective view of heating elements, electrical bus bars, electrical leads, and a ground bus bar according to an alternative embodiment of the present invention. This view makes easier an illustration of those components by omitting other components. Electrical bus bars 306 and ground bus bar 310 are shown. Electrical bus bars 306 are shown with electrical leads 308. Ground bus bar 310 is shown with first lead 312. Heating elements 316 are shown overlaying electrical bus bars 306 and ground bus bar 310. First leads 318 and second lead 320 are also shown.

FIG. 8 shows a connection of an electrical bus bar lead and a heating element according to an alternative embodiment of the present invention. Electrical lead 308, here shown having a J-shape, shown partly covered by heating element 316 (by dotted lines) and partly not covered by heating element 316. Second barrier layer 314 is not shown. A part of electrical lead 308 is shown electrically connected to heating element 316 where electrical lead 308 is atop heating element 316.

FIG. 9 shows an exploded view of electrical bus bars, a ground bus bar, and a first barrier layer according to an alternative embodiment of the present invention. This view shows first barrier layer 304, electrical bus bars 306, electrical leads 308, ground bus bar 310, and first lead 312 from above the leading edge.

Figure 10A:
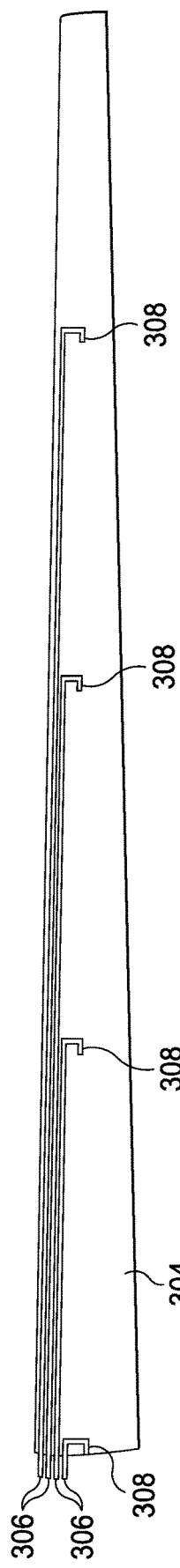
FIG. 10A shows a view of electrical bus bars, electrical leads, and a first barrier layer according to an alternative embodiment of the present invention.

FIG. 10A shows a view of electrical bus bars, electrical leads, and a first barrier layer according to an alternative embodiment of the present invention. This view shows first barrier layer 304, electrical bus bars 306, and electrical leads 308.

Figure 10B:
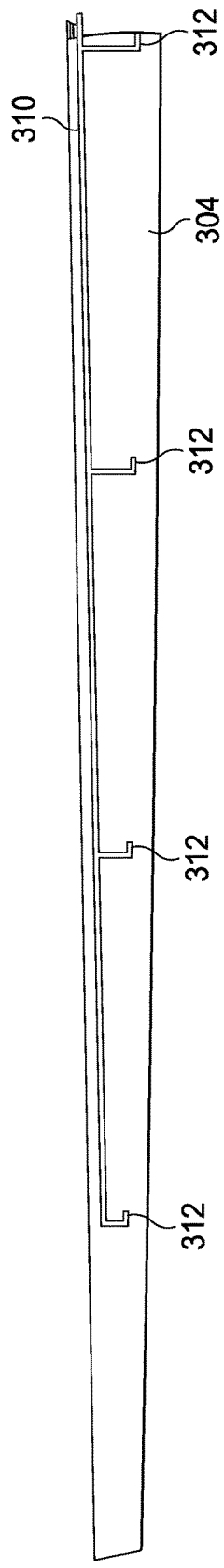
FIG. 10B shows a view of a ground bus bar, ground leads, and a first barrier layer according to an alternative embodiment of the present invention.

FIG. 10B shows a view of the ground bus bar, ground leads, and a first barrier layer according to an embodiment of the present invention. The view is shows ground bus bar 310, ground leads 312, and first barrier layer 304.

Figure 11:
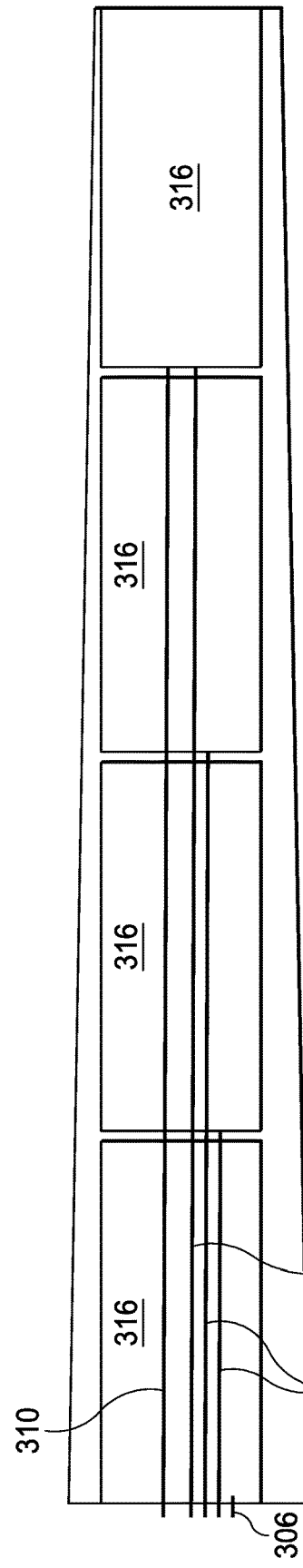
FIG. 11 shows a top flattened plan view of electrical bus bars, a ground bus bar, and heating elements according to an alternative embodiment of the present invention.

FIG. 11 shows a flattened plan view of electrical bus bars, a ground bus bar, and heating elements according to an alternative embodiment of the present invention. In this view, both the upper and lower surfaces are shown. Electrical bus bars 306 and ground bus bar 310 are shown with heating elements 316.

Figure 12:
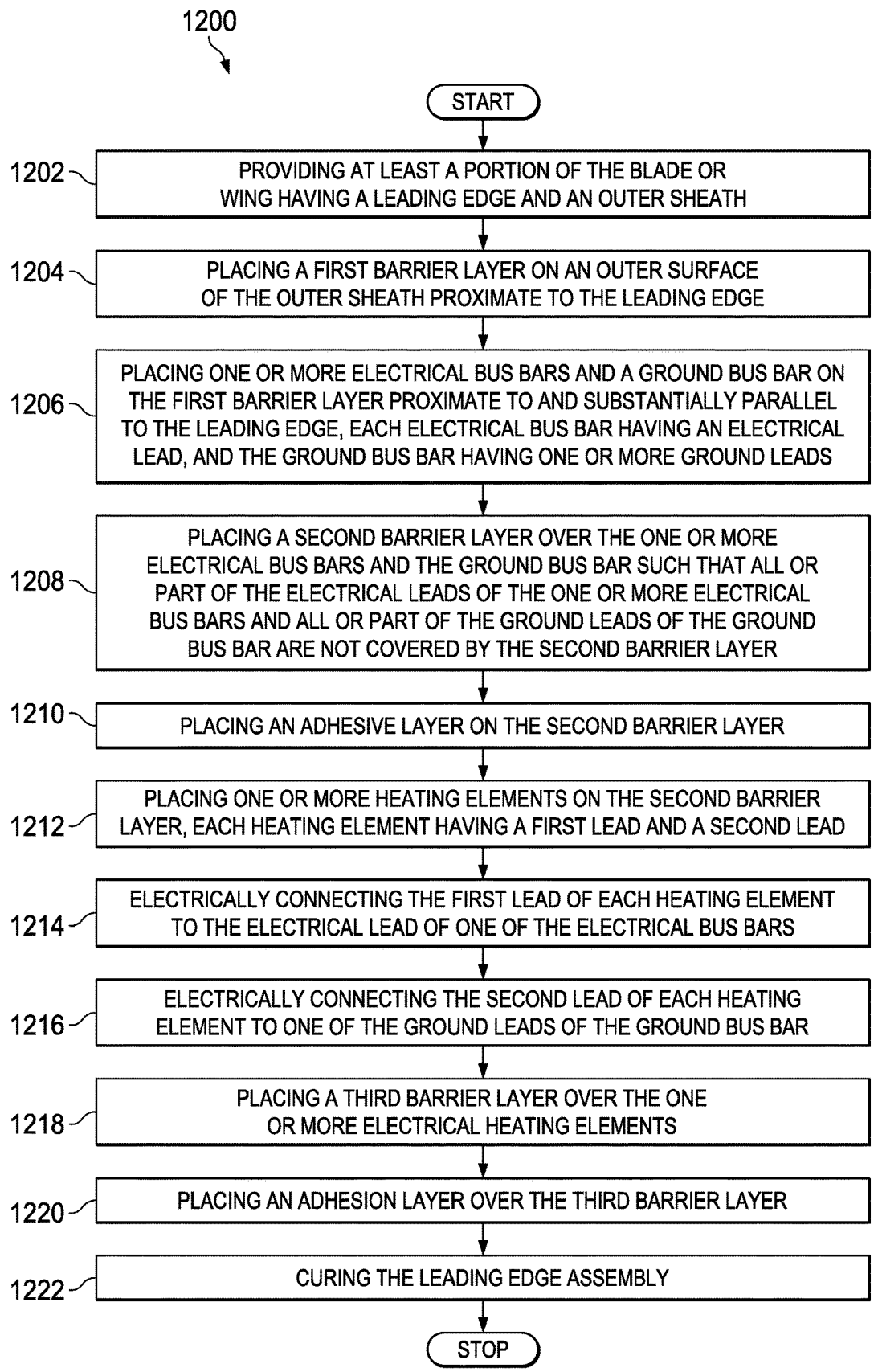
FIG. 12 is a flowchart that shows a method for fabricating a leading edge assembly according to an alternative embodiment of the present invention.

FIG. 12 is a flowchart that illustrates a method for fabricating a leading edge assembly according to an alternative embodiment of the present invention. Method 1200 for fabricating a leading edge assembly of a blade or wing begins with step 1202, providing at least a portion of the blade or wing having a leading edge and an outer sheath 302. Method 1200 continues with step 1204, placing a first barrier layer 304 on an outer surface of the outer sheath 302 proximate to the leading edge. Method 1200 continues with step 1206, placing one or more electrical bus bars 306 and a ground bus bar 310 on the first barrier layer 304 proximate to and substantially parallel to the leading edge, each electrical bus bar having an electrical lead 308, and the ground bus bar 310 having one or more ground leads 312. Method 1200 continues with step 1208, placing a second barrier layer 314 over the one or more electrical bus bars 306 and the ground bus bar 310 such that all or part of the electrical leads 308 of the one or more electrical bus bars 306 and all or part of the ground leads 312 of the ground bus bar 310 are not covered by the second barrier layer 314. Method 1200 may also include placing an adhesive layer 324 on the first barrier layer 304, the one or more electrical bus bars 306, the ground bus bar 310, the second barrier layer 314, the one or more heating elements 316, or the third barrier layer 322; an exemplary step 1210, placing an adhesive layer 324 on the second barrier layer 314, is shown in FIG. 12.

Continuing reference to FIG. 12, method 1200 continues with step 1212, placing one or more heating elements 316 on the second barrier layer 314, each heating element 316 having a first lead 318 and a second lead 320. Method 1200 continues with step 1214, electrically connecting the first lead 318 of each heating element 316 to the electrical lead 308 of one of the electrical bus bars 306. Method 1200 continues with step 1216, electrically connecting the second lead 320 of each heating element 316 to one of the ground leads 312 of the ground bus bar 310. Method 1200 continues with step 1218, placing a third barrier layer 322 over the one or more heating elements 316. Method 1200 continues with step 1220, placing an adhesion layer 326 over the third barrier layer 322. Method 1200 continues with step 1222, curing the leading edge assembly.

It will be understood that particular embodiments described herein are shown by way of illustration and not as limitations of the invention. The principal features of this invention can be employed in various embodiments without departing from the scope of the invention. Those skilled in the art will recognize, or be able to ascertain using no more than routine experimentation, numerous equivalents to the specific procedures described herein. Such equivalents are considered to be within the scope of this invention and are covered by the claims.

All publications and patent applications mentioned in the specification are indicative of the level of skill of those skilled in the art to which this invention pertains. All publications and patent applications are herein incorporated by reference to the same extent as if each individual publication or patent application was specifically and individually indicated to be incorporated by reference.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps. In embodiments of any of the compositions and methods provided herein, "comprising" may be replaced with "consisting essentially of" or "consisting of". As used herein, the phrase "consisting essentially of" requires the specified integer(s) or steps as well as those that do not materially affect the character or function of the claimed invention. As used herein, the term "consisting" is used to indicate the presence of the recited integer (e.g., a feature, an element, a characteristic, a property, a method/process step or a limitation) or group of integers (e.g., feature(s), element(s), characteristic(s), propertie(s), method/process steps or limitation(s)) only.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AB, BBC, AAABCCCC, CBBAAA, CABABB, and so forth. The skilled artisan will understand that typically there is no limit on the number of items or terms in any combination, unless otherwise apparent from the context.

As used herein, words of approximation such as, without limitation, "about", "substantial" or "substantially" refers to a condition that when so modified is understood to not necessarily be absolute or perfect but would be considered close enough to those of ordinary skill in the art to warrant designating the condition as being present. The extent to which the description may vary will depend on how great a change can be instituted and still have one of ordinary skilled in the art recognize the modified feature as still having the required characteristics and capabilities of the unmodified feature. In general, but subject to the preceding discussion, a numerical value herein that is modified by a word of approximation such as "about" may vary from the stated value by at least ±1, 2, 3, 4, 5, 6, 7, 10, 12 or 15%.

All of the devices and/or methods disclosed and claimed herein can be made and executed without undue experimentation in light of the present disclosure. While the devices and/or and methods of this invention have been described in terms of preferred embodiments, it will be apparent to those of skill in the art that variations may be applied to the compositions and/or methods and in the steps or in the sequence of steps of the method described herein without departing from the concept, spirit and scope of the invention. All such similar substitutes and modifications apparent to those skilled in the art are deemed to be within the spirit, scope and concept of the invention as defined by the appended claims.

Furthermore, no limitations are intended to the details of construction or design herein shown, other than as described in the claims below. It is therefore evident that the particular embodiments disclosed above may be altered or modified and all such variations are considered within the scope and spirit of the disclosure. Accordingly, the protection sought herein is as set forth in the claims below.

To aid the Patent Office, and any readers of any patent issued on this application in interpreting the claims appended hereto, applicants wish to note that they do not intend any of the appended claims to invoke paragraph 6 of 35 U.S.C. § 112 as it exists on the date of filing hereof unless the words "means for" or "step for" are explicitly used in the particular claim.

What is claimed is:

1. A heating element assembly for a blade or wing comprising:
   a first barrier layer configured to cover a leading edge of the blade or wing;
   one or more electrical bus bars disposed on the first barrier layer proximate to and substantially parallel with the leading edge, each electrical bus bar for one of one or more heating elements and having an electrical lead for the heating element that extends chordwise away from the electrical bus bar and the leading edge of the blade or wing;

a ground bus bar disposed on the first barrier layer proximate to and substantially parallel with the leading edge, the ground bus bar having a ground lead for each heating element that extend chordwise away from the ground bus bar and the leading edge of the blade or wing;

a second barrier layer disposed over the one or more electrical bus bars and the ground bus bar such that all or part of the electrical leads of the one or more electrical bus bars and all or part of the ground leads of the ground bus bar are not covered by the second barrier layer;

the one or more heating elements disposed on the second barrier layer over the one or more electrical bus bars and the ground bus bar, and each heating element having a first lead electrically connected to the electrical lead of one of the electrical bus bars and a second lead electrically connected to one of the ground leads of the ground bus bar;

a third barrier layer disposed over the one or more heating elements;

the first barrier layer, the second barrier layer and the third barrier layer comprise composite layers for insulation; and the one or more electrical bus bars and the ground bus bar are substantially disposed on and near both sides of the forward bend of the leading edge of the blade or wing and are not disposed on the remainder of the chordwise area of the blade or wing away from the leading edge.

2. The heating element assembly of claim 1, wherein:
the electrical lead of each electrical bus bar is J-shaped, L-shaped or has an enlarged end forming a contact pad; and
each ground lead of the ground bus bar is J-shaped, L-shaped or has an enlarged end forming a contact pad.

3. The heating element assembly of claim 1, wherein the first lead and second lead of each heating element is J-shaped, L-shaped or has an enlarged end forming a contact pad.

4. The heating element assembly of claim 1, further comprising an adhesive layer disposed on the first barrier layer, the one or more electrical bus bars, the ground bus bar, the second barrier layer, or the one or more heating elements.

5. The heating element assembly of claim 1, wherein the first barrier layer, the second barrier layer, or the third barrier layer comprise a coating or a sleeve.

6. The heating element assembly of claim 1, wherein the first barrier layer and the third barrier layer substantially encapsulate the one or more electrical bus bars, the ground bus bar, the second barrier layer and the one or more heating elements.

7. The heating element assembly of claim 1, further comprising an adhesion layer disposed on the third barrier layer.

8. The heating element assembly of claim 7, further comprising a nose guard or protective layer disposed on a portion of the adhesion layer proximate to the leading edge.

9. The heating element assembly of claim 1, further comprising a controller electrically connected to the one or more electrical bus bars that operates and monitors the one or more heating elements.

10. A heating system for a blade or wing comprising:
the blade or wing having a leading edge and an outer sheath;
a first barrier layer disposed on a portion of the outer sheath that covers the leading edge of the blade or wing;

one or more electrical bus bars disposed on the first barrier layer proximate to and substantially parallel with the leading edge, each electrical bus bar for one of one or more heating elements and having an electrical lead for the heating element that extends chordwise away from the electrical bus bar and the leading edge of the blade or wing;

a ground bus bar disposed on the first barrier layer proximate to and substantially parallel with the leading edge, the ground bus bar having a ground lead for each heating element that extend chordwise away from the ground bus bar and the leading edge of the blade or wing;

a second barrier layer disposed over the one or more electrical bus bars and the ground bus bar such that all or part of the electrical leads of the one or more electrical bus bars and all or part of the ground leads of the ground bus bar are not covered by the second barrier layer;

the one or more heating elements disposed on the second barrier layer over the one or more electrical bus bars and the ground bus bar, each heating element having a first lead electrically connected to the electrical lead of one of the electrical bus bars and a second lead electrically connected to one of the ground leads of the ground bus bar;

a third barrier layer disposed over the one or more heating elements;

an adhesion layer disposed on the third barrier layer;

a controller electrically connected to the one or more electrical bus bars that operates and monitors the one or more heating elements;

the ground bus bar is either electrically connected to the controller or a common ground;

the first barrier layer, the second barrier layer and the third barrier layer comprise composite layers for insulation; and the one or more electrical bus bars and the ground bus bar are substantially disposed on and near both sides of the forward bend of the leading edge of the blade or wing and are not disposed on the remainder of the chordwise area of the blade or wing away from the leading edge.

11. The heating system of claim 10, wherein:
the electrical lead of each electrical bus bar is J-shaped, L-shaped or has an enlarged end forming a contact pad; and
each ground lead of the ground bus bar is J-shaped, L-shaped or has an enlarged end forming a contact pad.

12. The heating system of claim 10, wherein the first lead and second lead of each heating element is J-shaped, L-shaped or has an enlarged end forming a contact pad.

13. The heating system of claim 10, further comprising an adhesive layer disposed on the first barrier layer, the one or more electrical bus bars, the ground bus bar, the second barrier layer, the one or more heating elements, or the third barrier layer.

14. The heating system of claim 10, wherein the first barrier layer, the second barrier layer, or the third barrier layer comprise a coating or a sleeve.

15. The heating system of claim 10, wherein the first barrier layer and the third barrier layer substantially encapsulate the one or more electrical bus bars, the ground bus bar, the second barrier layer and the one or more heating elements.

16. The heating system of claim 10, further comprising a nose guard or protective layer on a portion of the adhesion layer proximate to the leading edge.

17. The heating system of claim 10, wherein:
the blade is part of a propeller, a proprotor, a rotor or a wind turbine; or
the wing is part of a fixed-wing aircraft, a tilt-rotor aircraft or a rotorcraft.

18. A method for fabricating a leading edge assembly of a blade or wing comprising:
providing at least a portion of the blade or wing having a leading edge and an outer sheath;
placing a first barrier layer on an outer surface of the outer sheath proximate to the leading edge;
placing one or more electrical bus bars and a ground bus bar on the first barrier layer proximate to and substantially parallel to the leading edge, each electrical bus bar for one of one or more heating elements and having an electrical lead for the heating element that extends chordwise away from the electrical bus bar and the leading edge of the blade or wing, and the ground bus bar having a ground lead for each heating element that extend chordwise away from the ground bus bar and the leading edge of the blade or wing;
placing a second barrier layer over the one or more electrical bus bars and the ground bus bar such that all or part of the electrical leads of the one or more electrical bus bars and all or part of the ground leads of the ground bus bar are not covered by the second barrier layer;
placing the one or more heating elements on the second barrier layer over the one or more electrical bus bars and the ground bus bar, each heating element having a first lead and a second lead;
electrically connecting the first lead of each heating element to the electrical lead of one of the electrical bus bars;
electrically connecting the second lead of each heating element to one of the ground leads of the ground bus bar;
placing a third barrier layer over the one or more heating elements; placing an adhesion layer over the third barrier layer;
the first barrier layer, the second barrier layer and the third barrier layer comprise composite layers for insulation; and
the one or more electrical bus bars and the ground bus bar are substantially disposed on and near both sides of the forward bend of the leading edge of the blade or wing and are not disposed on the remainder of the chordwise area of the blade or wing away from the leading edge.

19. The method of claim 18, wherein:
the electrical lead of each electrical bus bar is J-shaped, L-shaped or has an enlarged end forming a contact pad; and
each ground lead of the ground bus bar is J-shaped, L-shaped or has an enlarged end forming a contact pad.

20. The method of claim 18, wherein the first lead and second lead of each heating element is J-shaped, L-shaped or has an enlarged end forming a contact pad.

21. The method of claim 18, further comprising placing an adhesive layer on the first barrier layer, the one or more electrical bus bars, the ground bus bar, the second barrier layer, the one or more heating elements, or the third barrier layer.

22. The method of claim 18, wherein the first barrier layer, the second barrier layer, or the third barrier layer comprise a coating or a sleeve.

23. The method of claim 18, wherein the first barrier layer and the third barrier layer substantially encapsulate the one or more electrical bus bars, the ground bus bar, the second barrier layer and the one or more heating elements.

24. The method of claim 18, further comprising placing a nose guard or protective layer on a portion of the adhesion layer proximate to the leading edge.

25. The method of claim 18, further comprising bonding the first barrier layer, the one or more electrical bus bars, the ground bus bar, the second barrier layer, the one or more heating elements, the third barrier layer and the adhesion layer to one another.

26. The method of claim 18, further comprising curing the leading edge assembly.

27. A method for controlling a heating system for a blade or wing comprising:
providing the blade or wing having a leading edge, an outer sheath and the heating system, the heating system comprising:
a first harrier layer disposed on a portion of the outer sheath that covers a leading edge of the blade or wing,
one or more electrical bus bars disposed on the first barrier layer proximate to and substantially parallel with the leading edge, each electrical bus bar for one of one or more heating elements and having an electrical lead for the heating element that extends chordwise away from the electrical bus bar and the leading edge of the blade or wing,
a ground bus bar disposed on the first barrier layer proximate to and substantially parallel with the leading edge, the ground bus bar having a ground lead for each heating element that extend chordwise away from the ground bus bar and the leading edge of the blade or wing,
a second barrier layer disposed over the one or more electrical bus bars and the ground bus bar such that all or part of the electrical leads of the one or more electrical bus bars and all or part of the ground leads of the ground bus bar are not covered by the second barrier layer,
the one or more heating elements disposed on the second barrier layer over the one or more electrical bus bars and the ground bus bar, each heating element having a first lead electrically connected to the electrical lead of one of the electrical bus bars and a second lead electrically connected to one of the ground leads of the ground bus bar,
a third barrier layer disposed over the one or more heating elements,
an adhesion layer disposed on the third barrier layer,
a controller electrically connected to the one or more electrical bus bars that operates and monitors the one or more heating elements,
the ground bus bar is either electrically connected to the controller or a common ground, and
the one or more electrical his bars and the ground bus bar are substantially disposed on and near both sides of the forward bend of the leading edge of the blade or wing and are not disposed on the remainder of the chordwise area of the blade or wing away from the leading edge;
monitoring one or more operational parameters;
controlling the one or more heating elements in response to the operational parameters using the controller to de-ice the blade or wing, or prevent icing of the blade or wing; and the first barrier layer, the second barrier layer and the third barrier layer comprise composite layers for insulation.

28. An aircraft, comprising:
a fuselage;
a blade or wing coupled to the fuselage, the black or wing comprising a heating element, the heating element comprising;
  a first barrier layer configured to cover a leading edge of the blade or wing;
  one or more electrical bus bars disposed on the first barrier layer proximate to and substantially parallel with the leading edge, each electrical bus bar for one of one or more heating elements and having an electrical lead for the heating element that extends chordwise away from the electrical bus bar and the leading edge of the blade or wing;
  a ground bus bar disposed on the first barrier layer proximate to and substantially parallel with the leading edge, the ground bus bar having a ground lead for each heating element that extend chordwise away from the ground bus bar and the leading, edge of the blade or wing;
  a second barrier layer disposed over the one or more electrical bus bars and the ground bus bar such that all or part of the electrical leads of the one or more electrical bus bars and all or part of the ground leads of the ground bus bar are not covered by the second barrier layer;
  the one or more heating elements disposed on the second barrier layer over the one or more electrical bus bars and the ground bus bar, and each heating element having, a first lead electrically connected to the electrical lead of one of the electrical bus bars and a second lead electrically connected to one of the ground leads of the ground bus bar;
  a third barrier layer disposed over the one or more heating elements;
  the first barrier layer, the second barrier layer and the third barrier layer comprise composite layers for insulation; and
  the one or more electrical bus bars and the ground bus bar are substantially disposed on and near both sides of the forward bend of the leading edge of the blade or wing and are not disposed on the remainder of the chordwise area of the blade or wing away from the leading edge.

* * * * *